US011442945B1

(12) United States Patent
Tsai et al.

(10) Patent No.: US 11,442,945 B1
(45) Date of Patent: Sep. 13, 2022

(54) DYNAMIC FRESHNESS FOR RELEVANCE RANKINGS

(71) Applicant: Groupon, Inc., Chicago, IL (US)

(72) Inventors: Ming-Chi Tsai, Belmont, CA (US); Amber Roy Chowdhury, Bellevue, WA (US); Tong Zhao, San Jose, CA (US)

(73) Assignee: Groupon, Inc., Chicago, IL (US)

( * ) Notice: Subject to any disclaimer, the term of this patent is extended or adjusted under 35 U.S.C. 154(b) by 474 days.

(21) Appl. No.: 15/393,721

(22) Filed: Dec. 29, 2016

Related U.S. Application Data

(60) Provisional application No. 62/274,048, filed on Dec. 31, 2015.

(51) Int. Cl.
*G06F 16/2457* (2019.01)
*G06N 7/00* (2006.01)
*G06F 16/23* (2019.01)

(52) U.S. Cl.
CPC .... *G06F 16/24578* (2019.01); *G06F 16/2379* (2019.01); *G06N 7/005* (2013.01)

(58) Field of Classification Search
CPC .......... G06F 16/24578; G06Q 30/0201; G06Q 30/02; G06N 20/00; G06N 3/08; G06N 7/005; G06N 5/003
See application file for complete search history.

(56) References Cited

U.S. PATENT DOCUMENTS

| 7,406,434 | B1* | 7/2008 | Chang | G06Q 10/06375 |
| | | | | 705/14.43 |
| 8,126,891 | B2* | 2/2012 | Laxman | G06N 20/00 |
| | | | | 707/736 |
| 8,819,004 | B1 | 8/2014 | Petcherski et al. | |
| 8,832,088 | B1* | 9/2014 | Chen | G06Q 30/00 |
| | | | | 707/723 |
| 9,088,533 | B1* | 7/2015 | Zeng | G06Q 10/107 |
| 9,412,127 | B2 | 8/2016 | Dumon et al. | |
| 9,779,441 | B1 | 10/2017 | Jadhav et al. | |
| 10,032,180 | B1 | 7/2018 | Shariff et al. | |
| 2002/0010769 | A1* | 1/2002 | Kippenhan, III | G06Q 10/087 |
| | | | | 709/223 |
| 2002/0059204 | A1 | 5/2002 | Harris | |
| 2003/0088544 | A1 | 5/2003 | Kan et al. | |

(Continued)

OTHER PUBLICATIONS

U.S. Appl. No. 14/824,934, filed Aug. 12, 2015.

(Continued)

*Primary Examiner* — Cheyne D Ly
(74) *Attorney, Agent, or Firm* — Alston & Bird LLP

(57) ABSTRACT

Techniques for integrating freshness and relevance within a programmatic relevance service are discussed herein. Some embodiments may include a relevance service system, including one or more batch processors and one or more online processors. The one or more batch processors may be configured to track message recipient behavior from electronic clickstream data, and generate models of functions that predict access probability for individual users. The one or more online processors may use the access probability calculated in batch to facilitate on demand deal ranking adjustments that account for freshness as informed by the predicted access probability for communications sent to the user.

23 Claims, 8 Drawing Sheets

(56) References Cited

U.S. PATENT DOCUMENTS

| | | | |
|---|---|---|---|
| 2005/0071741 A1* | 3/2005 | Acharya | G06Q 30/0246 |
| | | | 715/208 |
| 2007/0203940 A1 | 8/2007 | Wang et al. | |
| 2007/0255689 A1 | 11/2007 | Sun et al. | |
| 2008/0033910 A1 | 2/2008 | Richards et al. | |
| 2009/0094196 A1* | 4/2009 | Piwowarski | G06F 16/954 |
| 2010/0094878 A1* | 4/2010 | Soroca | G06Q 30/02 |
| | | | 707/748 |
| 2011/0078049 A1 | 3/2011 | Rehman et al. | |
| 2012/0059707 A1 | 3/2012 | Goenka et al. | |
| 2012/0078881 A1 | 3/2012 | Crump et al. | |
| 2012/0084277 A1 | 4/2012 | Barve et al. | |
| 2013/0173571 A1* | 7/2013 | Chen | G06F 16/00 |
| | | | 707/706 |
| 2014/0236708 A1 | 8/2014 | Wolff et al. | |
| 2015/0066594 A1 | 3/2015 | Li et al. | |
| 2015/0142787 A1 | 5/2015 | Kimmerling | |
| 2015/0269609 A1* | 9/2015 | Mehanian | G06Q 30/0254 |
| | | | 705/14.45 |
| 2016/0171540 A1 | 6/2016 | Mangipudi et al. | |
| 2017/0154356 A1* | 6/2017 | Trevisiol | G06Q 30/0272 |

OTHER PUBLICATIONS

U.S. Appl. No. 14/824,929, filed Aug. 12, 2015.
U.S. Appl. No. 14/824,922, filed Aug. 12, 2015.
"Conjugate Prior." [retrieved Mar. 28, 2017], Retrieved via the Internet Archive Wayback Machine at <URL: http://web.archive.org/web/20150324191740/https://en.wikipedia.org/wiki/Conjugate_prior> (Mar. 24, 2015), 6 pages.
U.S. Appl. No. 14/824,912, entitled "Universal Relevance Service Framework", first named inventor Amber Roy Chowdhury, filed Aug. 12, 2015, 59 pages.
U.S. Appl. No. 15/393,721, filed Dec. 29, 2016.
Elasticsearch Server, a practical guide to building fast, scalable, and flexible search solutions (first edition Feb. 2013, second edition Apr. 2014). See pp. 15-17.

* cited by examiner

DYNAMIC FRESHNESS FOR RELEVANCE RANKINGS

CROSS-REFERENCE TO RELATED APPLICATIONS

The present application claims the benefit of U.S. Provisional Patent Application Ser. No. 62/274,048 which was filed on Dec. 31, 2015 and titled DYNAMIC FRESHNESS FOR RELEVANCE RANKINGS, the entire content of which is incorporated by reference herein for all purposes.

FIELD

Embodiments of the invention relate, generally, to programmatically integrating relevance rankings from historical data with fresh content. Some example implementations of embodiments of the invention are particularly advantageous in the automatic creation and targeting of electronic messages.

BACKGROUND

Current methods for identifying offerings of most interest (i.e., most relevance) to potential message recipients based on collected data describing attributes of the potential recipients and items being offered to the recipients exhibit a plurality of problems that make current systems insufficient, ineffective and/or the like. Through applied effort, ingenuity, and innovation, solutions to improve such methods have been realized and are described in connection with embodiments of the present invention.

SUMMARY

In general, embodiments of the present invention provide herein systems, methods and computer readable media to integrate programmatic selection of fresh content with relevance rankings generated based on historical data.

Serendipity and relevancy are two conflicting yet important forces in a programmatic ranking system. At one end of the spectrum, it is desirable to provide users (or consumers) with the most known relevant items (or deals) but at the same time, it is also desirable to provide some unexpected or "fresh" items to the users.

Serendipity and relevancy are conflicting in the sense that they impose different requirements on deal selection in an environment where deal sends, accesses, and slots per communication are limited. For example, electronic marketing communications include a limited number of deal slots, and users will view a limited number of communications per day, if any. The top deal in slot 1 of an email communication typically drives the subject line, and is the most relevant deal. If a top deal is sent several times in a span of a few days, for example, the same subject line would show up, resulting in user confusion and a poor experience. As such, there is a need to effectively balance serendipity and relevance in programmatic deal ranking and selection to keep deals diverse, different, but at the same time without entirely sacrificing relevancy.

As discussed in U.S. patent application Ser. No. 14/824,912, entitled "Universal Relevance Service Framework," filed Aug. 12, 2015, which is incorporated by reference herein in its entirety, a programmatic ranking system may calculate user-deal relevance scores for deals based on Odds (past performance data (historical conversion) computed from jointed user and deal attributes); DDO (past deal performance, based on mapping an individual deal's performance data to all users similar to the given user); and Similarity (a computation of the likelihood that the given user's preference is similar to the given deal). In some situations, a deal-relevance score can be based on Freshness (a possible penalty based on whether the particular deal has been exposed previously to the particular user); and Purchase Backoff (similar to freshness, but instead a possible penalty if the given user has purchased the particular deal recently), driving serendipity. The use of freshness helps achieve the goal of serendipity by allowing the relevance scores of deals to be deboosted or reduced when users have already received or accessed the deal, thereby increasing the chances of unexpected relevant finding for the users when one or more top ranked deals are provided to the users (e.g., via email, application alert, in response to a search, etc.).

With respect to freshness, the inventors have appreciated that the effectiveness (e.g., in terms of conversion rate of offered deals) of demoting deal-relevance scores based on whether they have been previously sent, varies depending on the level of user activity. While serendipity is effective for active users, it is relatively less effective than higher relevance (e.g., based on DDO, Odds, and Similarity) to inactive users. Put another way, less active users are more likely to purchase or accept a deal when repeatedly good performing (e.g., highly relevant) deals are sent, even repeatedly. Since less active users don't tend to access electronic marketing communications (e.g., open their emails), improved techniques for modeling the way users access the electronic marketing communications may be leveraged to better provide freshness to user. As such, embodiments discussed herein may provide techniques for programmatic deal ranking that incorporates consideration for freshness in a manner that varies depending on the behavior of individually tracked users.

Typical relevance systems are implemented to optimize their performance for various aspects of the particular context or environment in which they are deployed. For example, batch systems typically support use cases such as targeted electronic messaging to consumers about available offerings. Real time systems typically support business use cases such as responding to search queries. Separate code bases leads to duplicate efforts and over-diversification of both the architecture and production systems. Incremental improvements to each code base in response to short business focus may lead to high development and operational costs.

In some embodiments, a relevance service framework has been implemented to address these problems as well as to be able to scale gracefully as the business grows by horizontal scaling without practical limitation to numbers of item listings. In addition, the framework architecture meets performance requirements by supporting the integration of user-personalized freshness with programmatic relevance rankings of promotional items.

In embodiments, the relevance service is a plug-in framework to enable seamless integration of evolving code (e.g., personalization and relevance ranking) being developed in-house as well as by third parties. In embodiments, the framework meets architectural goals of performance and scalability, extensibility, accountability, and manageability while providing support for both real time and batch processing. For example, an offline freshness score calculator (e.g., implemented on one or more batch processors) may be configured to track clickstream data defining user interactions with offered deals, and generate freshness score tables defining deal-relevance score decrement amounts that can be used on demand by real-time (e.g., online) processors that provide a relevance service.

In an example embodiment, a relevance service system is provided, the system, comprising one or more batch processors configured to: track clickstream data generated by a plurality of user device interactions of a user with electronic communications indicating user access behavior for the electronic communications; determine, based on the clickstream data, a user access probability function defining a probability that the user will access an electronic communication as a function of time elapsed after the electronic communication is provided to the user device; determine, based on the user access probability function and the one or more times the communication content has been provided to the user device, a freshness score defining user access probability for a subsequent electronic communication comprising the communication content; and store the freshness score in a database; and one or more online processors configured to: generate a relevance score for the communication content in response to receiving a search request; apply the freshness score stored in the database to the relevance score to generate an updated relevance score; rank a plurality of communication content sets comprising at least the communication content based on their respective updated relevance scores; and return one or more top ranked communication content sets based on the ranking of the plurality of communication content sets.

In some example implementations of such a system, the one or more batch processors configured to determine the access probability function comprises the one or more batch processors being configured to determine a parametric access probability function. In some such example implementations, and in other example implementations, the one or more batch processors configured to determine the parametric access probability function comprises the one or more batch processors being configured to: generate training data sets based on the clickstream data; generate a feature vector based on the clickstream data; determine, based on training a machine learning algorithm with the training data sets and the feature vector, the parametric access probability function as a function of the feature vector. In some such example implementations, and in other example implementations, the one or more batch processors configured to determine the freshness core comprises the one or more servers being configured to, on a scheduled basis: determine a feature set related to the feature vector; and determine the freshness score based on applying the feature set to a parametric probability function. In some example implementations of such a system, the parametric access probability function comprises a probability of the user opening the communication term and a cumulative distribution function for time to open term, and wherein at least one of the probability of the user opening the communication term or the cumulative distribution function for time to open term is generated based on training the machine learning algorithm with the training data sets.

In some example implementations, the one or more online processors configured to apply the freshness score stored in the database to the relevance score to generate an updated relevance score comprises the one or more online processors being configured to: determine a search feature set related to the feature vector; and select the freshness score from the database based on the search feature set. In some such example implementations, and in other example implementations, the one or more online processors configured to apply the freshness score stored in the database to the relevance score to generate an updated relevance score comprises the one or more online processors being configured to probabilistically apply a predefined penalty value to the relevance score based on the freshness score. In some example implementation, the one or more online processors configured to apply the freshness score stored in the database to the relevance score to generate an updated relevance score comprises the one or more online processors being configured to apply the freshness score as a scaling factor to the relevance score. In some example implementations, the one or more online processors configured to apply the freshness score stored in the database to the relevance score to generate an updated relevance score comprises the one or more online processors being configured to apply the freshness score subsequent to determining actual user access to the deal based on the clickstream data.

In some example implementations, the one or more online processors are further configured to: provide an electronic communication to a user device including the one or more top ranked communication content sets; and generate second clickstream data based on tracking user interactions with the electronic communication; and the one or more batch processors are further configured to, on a scheduled basis, update the user access probability function based on the second clickstream data.

In some example implementations, the one or more batch processors configured to determine the access probability function comprises the one or more batch processors being configured to determine a non-parametric access probability function.

In another embodiment, a computer-implemented method is provided, the method comprising: tracking clickstream data generated by a plurality of user device interactions of a user with electronic communications indicating user access behavior for the electronic communications; determining, based on the clickstream data, a user access probability function defining a probability that the user will access an electronic communication as a function of time elapsed after the electronic communication is provided to the user device; determining, based on the user access probability function and the one or more times the communication content has been provided to the user device, a freshness score defining user access probability for a subsequent electronic communication comprising the communication content; storing the freshness score in a database; generating a relevance score for the communication content in response to receiving a search request; applying the freshness score stored in the database to the relevance score to generate an updated relevance score; ranking a plurality of communication content sets comprising at least the communication content based on their respective updated relevance scores; and returning one or more top ranked communication content sets based on the ranking of the plurality of communication content sets.

In some example implementations of such a method, determining the access probability function comprises determining a parametric access probability function. In some such example implementations, and in other example implementations, determining the parametric access probability function comprises: generating training data sets based on the clickstream data; generating a feature vector based on the clickstream data; and determining, based on training a machine learning algorithm with the training data sets and the feature vector, the parametric access probability function as a function of the feature vector.

In some example implementations, determining the freshness core comprises, on a scheduled basis: determining a feature set related to the feature vector; and determining the freshness score based on applying the feature set to parametric probability function. In some example implementations, the parametric access probability function comprises a probability of the user opening the communication term and a cumulative distribution function for time to open term, and wherein at least one of the probability of the user opening the communication term or the cumulative distribution function for time to open term is generated based on training the machine learning algorithm with the training data sets.

In some example implementations, applying the freshness score stored in the database to the relevance score to generate an updated relevance score comprises: determining a search feature set related to the feature vector; and selecting the freshness score from the database based on the search feature set. In some example implementations, applying the freshness score stored in the database to the relevance score to generate an updated relevance score comprises probabilistically applying a predefined penalty value to the relevance score based on the freshness score. In some example implementations, applying the freshness score stored in the database to the relevance score to generate an updated relevance score comprises applying the freshness score as a scaling factor to the relevance score. In some example implementations, applying the freshness score stored in the database to the relevance score to generate an updated relevance score comprises applying the freshness score subsequent to determining actual user access to the deal based on the clickstream data.

In some example implementations, the method further comprises: providing an electronic communication to a user device including the one or more top ranked promotions; and generating second clickstream data based on tracking user interactions with the electronic communication; and on a scheduled basis, updating the consumer access probability function based on the second clickstream data.

In some example implementations, determining the access probability function comprises determining a non-parametric access probability function.

In another example embodiment, a computer program product is provided, the computer program product comprising at least one non-transitory computer-readable storage medium having computer-executable program code instruction stored therein, the computer-executable program code instructions comprising program code instructions configured to: track clickstream data generated by a plurality of user device interactions of a user with electronic communications indicating user access behavior for the electronic communications; determine, based on the clickstream data, a user access probability function defining a probability that the user will access an electronic communication as a function of time elapsed after the electronic communication is provided to the user device, wherein the computer-executable program code instructions comprise program code instructions configured to determine the access probability function by at least: determining a parametric access probability function; generating training data sets based on the clickstream data; generating a feature vector based on the clickstream data; and determining, based on training a machine learning algorithm with the training data sets and the feature vector, the parametric access probability function as a function of the feature vector; determine, based on the user access probability function and the one or more times the communication content has been provided to the user device, a freshness score defining user access probability for a subsequent electronic communication comprising the communication content; store the freshness score in a database; generate a relevance score for the communication content in response to receiving a search request; apply the freshness score stored in the database to the relevance score to generate an updated relevance score; rank a plurality of communication content sets comprising at least the communication content based on their respective updated relevance scores; and return one or more top ranked communication content sets based on the ranking of the plurality of communication content sets.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
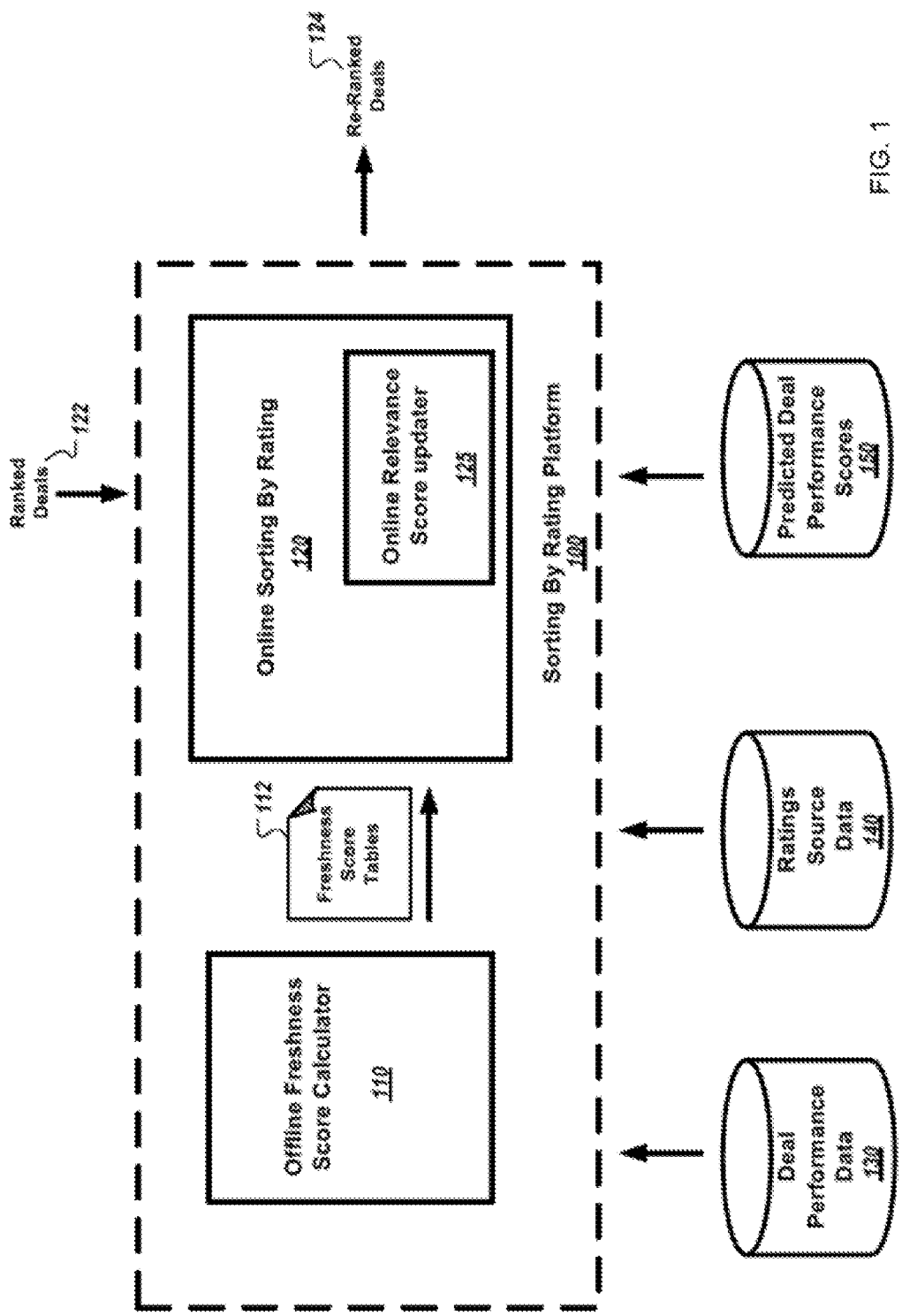
FIG. 1 illustrates an example system that can be configured to implement a sorting-by-rating platform in accordance with some embodiments.

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements. Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the terms "trilateral inventory object," "promotion" and "deal" may be used interchangeably to refer to a data instance or entity representing an agreement by a provider to provide particular goods, services and/or experiences to a user in response to receiving a user acceptance indication from an offering service. A trilateral inventory object is described by a set of transaction attributes, including data describing the provider, offering service to user transaction terms, and provider to offering service transaction terms, and a time period during which the trilateral inventory object is valid.

As used herein, the terms "offering service" and "deal offering service" may refer, without limitation, to a service that is accessible via one or more computing devices and is operable to offer deals for purchase to consumers. A deal offering service maintains an inventory of deals, from which it generates deal offering programs. A deal offering program includes a set of deals, most typically deals that are instances of the same deal entity. A deal offering program is described by a set of deal program attributes including the quantity of deals in the program, the time period during which the program is active, and, optionally, a rate of deal offering during the program.

A deal offering service is configured to offer a deal as an instrument that is redeemable by a consumer who purchases the deal for the goods, services, and/or experiences specified in the agreement. The deal offering service is further configured to illustrate or otherwise inform one or more consumers of the availability of one or more instruments in the form of one or more impressions. In some examples, the deal offering service may also take the form of a redemption authority, a payment processor, a rewards provider, an entity in a financial network, a promoter, an agent and/or the like. As such, the service is, in some example embodiments, configured to present one or more deals via one or more impressions, accept payments for deals from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce.

As used herein, the term "instrument" may be used, without limitation, to refer to any type of gift card, tender, electronic certificate, medium of exchange, voucher, or the like that embodies the terms of the deal from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more deals.

As used herein, the terms "consumer," "customer," and "user" may be used interchangeably to refer, without limitation, to a client, customer, purchaser, shopper, user or the like who may be in the position to or does exchange value for one or more instruments under the terms defined by the one or more deals.

FIG. 1 illustrates an example system 100 that can be configured to implement a sorting-by-rating platform. The system 100 may be implemented based one or more processors and one or more storage devices of a system, such as a promotion and marketing system. In some embodiments, the system 100 receives a ranked set of deals 122, each of which is associated with a relevance score; the set of deals 122 is ranked based on their respective relevance scores. In some embodiments, the system updates the relevance scores based on freshness scores of the promotions, and outputs the set of deals 124, re-ranked based on their respective updated scores.

In embodiments, sorting-by-rating platform 100 includes an online sorting by ranking module 120 that receives the input ranked deals 122, calculates the updated relevance scores, and outputs the re-ranked set of deals 124. In various embodiments, the sorting-by-rating platform 100 calculates the updated relevance scores based on one or a combination of input from an offline ranking freshness score calculator 110, which generates a set of freshness score tables 112 including scaling factor data associated with one or more previously sent deals (e.g., within a predefined time); and input from an online relevance score updater 125, which calculates updated relevance scores. In some example implementations, the sorting-by-rating platform 100 may incorporate into its calculation the updated relevance scores data received from any of a number of data repositories, including but not limited to deal performance data repository 130, ratings source data repository 140, and predicted deal performance scores repository 150.

The online relevance score updater 125 may be configured to calculate the updated relevance scores based on stored freshness score tables defining scaling factors or scaling functions that were generated offline by the offline freshness score calculator 110. The offline freshness score calculator 110 may be configured to track and analyze clickstream data, determine estimates for "access probability" of a deal offer, or the probability that a user accessed a sent deal offer, which is then used to determine freshness scores for adjusting deal-relevance rankings.

To determine the estimated access probability, the offline freshness score calculator 110 may be configured to use one or more of a (a) non-parametric approach or (b) a parametric machine learning approach. Under the non-parametric approach, access probability as a function of time may be determined based on counting the number of times the user accesses a deal (e.g., sent via email) versus the number of communications (e.g., emails) that have been sent including the deal, and tracking associated send and access times. While an efficient model for the probability of access in terms of processing requirements, the non-parametric approach does not take into account how the behavior of users can vary depending on other factors, such as seasonality effect, day of the week effect, and category of the deal.

The parametric machine learning approach provides for a more sophisticated machine trained model for access probability than the non-parametric approach. Advantageously, the machine learning model techniques discussed herein allow for both the programmatic discovery of access probability function(s) that might otherwise not be apparent to a human user by processing and incorporating large volumes of training data to refine the weightings and interrelations of dependent features. Furthermore, because centralized commercial systems perform numerous data processing and network transferring tasks of behalf of users, large volumes of clickstream data is generated that can only be managed and used by machines utilizing suitably configured learning functionality. In some embodiments, additional features of deals (e.g., seasonality effect, day of the week effect, time of day effect, distance from user effect, price range, slot location or prominence within a multi-deal electronic communication, category of the deal, etc.) and/or the user (e.g., age, gender, historic access rates or probabilities) may be used to create a feature vector for a machine learning technique, such as logistic regression, decision tree, etc. Training data sets generated from clickstream data to may then be used to train the access probability model for deal offers as a function of the feature vector, as discussed in greater detail below.

The offline freshness score calculator 110 may be further configured to, based on the access probability, generate freshness score tables 112 in an offline, batch, or scheduled (e.g., daily) process. The online relevance score updater 125 may be configured to update relevance scores of ranked deals 122 (e.g., calculated based on DDO, Odds, and Similarity) using the set of freshness score tables 112 that were generated offline freshness score calculator 110.

Figure 2:
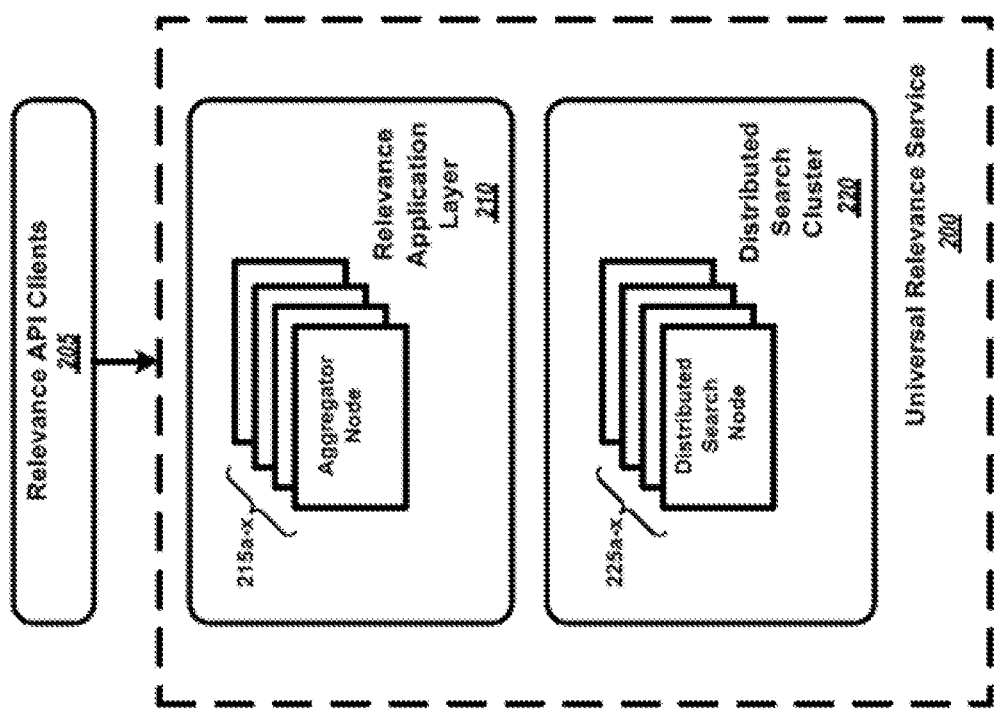
FIG. 2 illustrates an example system that can be configured to implement a real time universal relevance service framework in accordance with some embodiments.

FIG. 2 illustrates an example system that can be configured to implement a real time universal relevance service framework 200 as described, for example in U.S. patent application Ser. No. 14/824,912, incorporated by reference above. In some embodiments, system 200 comprises two separate layers: a relevance application layer 210 and a distributed search cluster 220. Plugins written against a relevance framework Software Development Kit (SDK) may be deployed and executed in both layers. In some embodiments, a sorting-by-rating platform 100 is deployed and executed within the framework 200 as a plugin.

In some embodiments, the implementation of a relevance service as a plug-in framework enables seamless integration of evolving code (e.g., personalization and relevance ranking) being developed in-house as well as by third parties. In some embodiments, the framework meets architectural goals of performance and scalability, extensibility, accountability, and manageability while providing support for both real time and batch processing.

Typical batch relevance systems are based on a computing model that applies relevance algorithms for all users and all offerings (deals); conceptually, this algorithm, iterating over all users and again over all deals, may be implemented as a series of pipelines consisting of multiple Hadoop MapReduce jobs. This means that accessing the results of a particular batch relevance computation will be limited to the requestor of the computation.

In some embodiments, the relevance service makes use of a continuous background computation model. Data sources used for batch (and real time indexing) are all available as streams of data. These streams can be used to trigger re-computation of affected relevance scores, such as to adjust relevance scores based on freshness considerations as discussed herein. For example, receiving updated purchase information for a user can trigger the computation of deal scores for that user. Receiving new information about how many units of a particular deal have been sold can trigger recalculation of scores for that particular deal. This then effectively becomes a model of background computation for partial scores, more specifically those scores that are independent of real time information that come with a request (such as location, time of day, etc.). In another example, batch or offline processing tasks may be performed on a scheduled basis, such as daily to provide the tables or other data (e.g., freshness score tables 112) that streamline or reduce online processing tasks for the relevance service.

As a result, a background computation system may contain all the scores and rankings necessary to perform the functions that depend on batch, e.g., Email send & push notifications. In addition, the background computation system can push these partial scores and rankings periodically into the real time, or online, system (e.g., ElasticSearch index) which can use them as provided without re-computation. Advantageously, the latency of real time processing is reduced, and throughput of the relevance service is increased without requiring additional networking or processing resources.

In some embodiments, the relevance system can decouple signal processing from servicing relevance computation requests by including a feature engineering infrastructure and real time data stores. Additionally, on-demand computation also has the side-effect that active users leverage compute resources more than non-active users. This enables performance improvements over typical systems based on models that treat all users equivalently, expending compute resources uniformly even if a user has not purchased anything in months.

Turning to FIG. 2, relevance application layer 210 is the user-facing (e.g., API clients 205) component and includes one or more aggregator nodes 215a-x that are fronted by at least one load balancer. The relevance API clients 205 may interface with these aggregator nodes 215a-x. Aggregator nodes 215a-x thus expose the relevance service API and may implement authorization and rate-limiting of clients 205, as well as perform a portion of the relevance processing algorithms (e.g., sorting and ranking).

The distributed search cluster 220 may include one or more distributed search nodes 225a-x and is internal to the system 200 (i.e., is not available for direct interaction from the relevance API clients 205). In various embodiments, distributed search cluster 220 may be implemented based on one or a combination of distributed search servers (e.g., open-source distributed search servers such as ElasticSearch, Solr, and Apache Lucene). In some embodiments, the universal relevance service framework code may be deployed as distributed search server plugins that implement functions such as item ranking/scoring such as, in some embodiments, sorting by the ranking platform 100.

In some embodiments, an aggregator node 215 generates and sends one or more product-specific searches to the distributed search cluster 220. In some embodiments, each product-specific search may include embedded data to be used in ranking/scoring of search results. In some embodiments in which the distributed search cluster supports a multi-query interface, the system generates a multi-query that includes multiple product searches 242a-x that may be executed in parallel by the distributed search cluster 220 against the product index.

Figure 3:
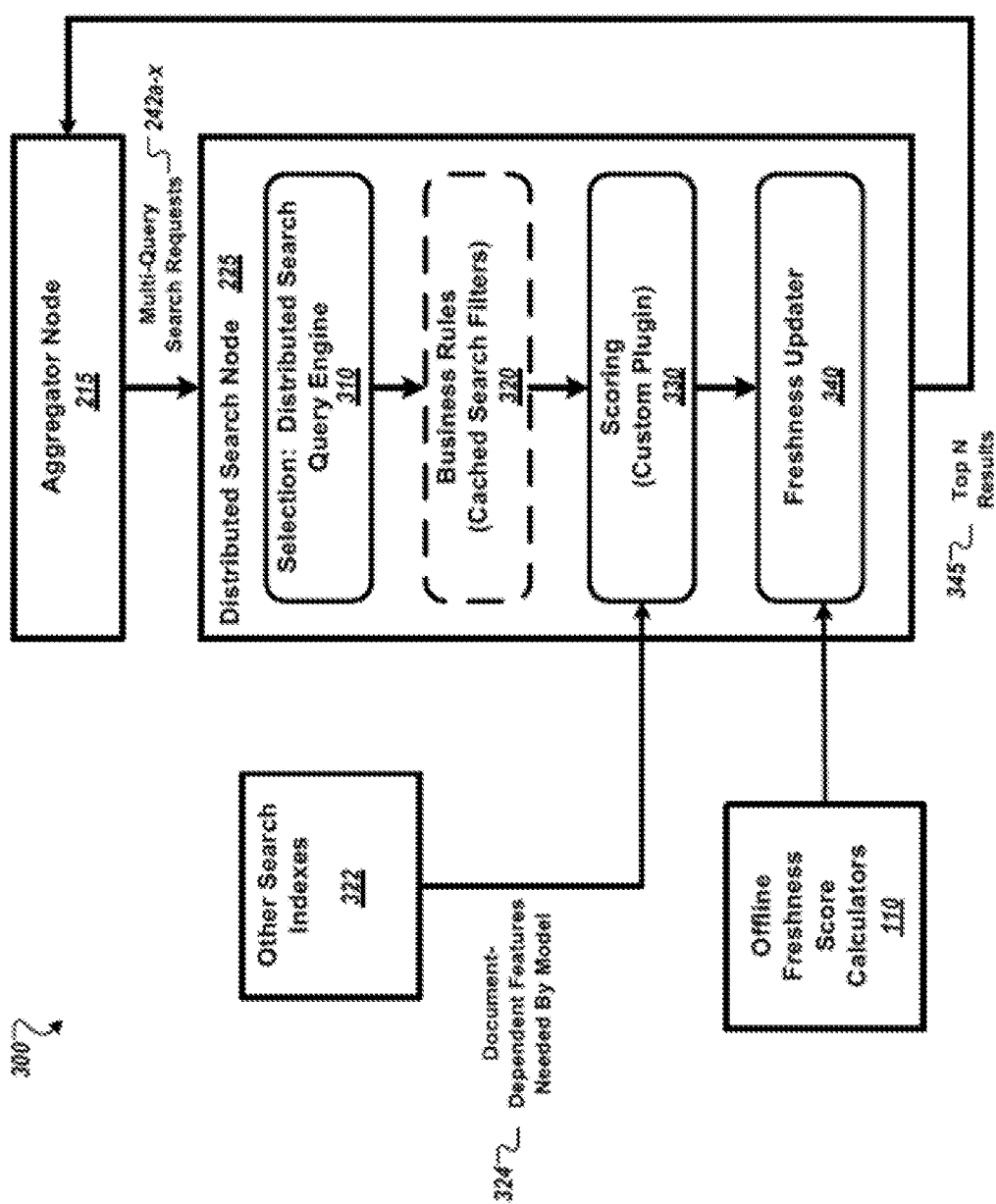
FIG. 3 illustrates the logical flow of processing by a distributed search node in response to receiving a multi-query search from an aggregator node in accordance with some embodiments.

FIG. 3 illustrates the logical flow of processing by a distributed search node 225 in response to receiving a multi-query search 242a-x from an aggregator node 215. In some embodiments, processing of a multi-query search may be sharded to be processed in parallel. In some embodiments, the distributed search node query engine implements selection of items 310 based on the data in the received search documents.

In some embodiments, the selected items optionally may be filtered according to item-level business rules 320.

In some embodiments, the selected items may be scored and ranked based on feature data that may come from multiple sources including one or a combination of the search payload (document-independent data such as context and request data); document-specific data; and document-dependent features 324 retrieved from other search indexes 322 that may be local or may be otherwise accessed. In some embodiments, ranking/scoring is implemented by a custom plugin 330. In some embodiments, the ranking and scoring may be further augmented by a freshness updater plugin 340.

In some embodiments, the top N ranked results 345 are returned to the aggregator node 215 that initiated the multi-query search. In some embodiments in which processing is implemented using sharding, the top N ranked results 345 are selected during rollup of the shard ranking results. In some embodiments, the value of N may be configurable and fetch limits may be applied (for example, fetch limits may be applied per client and/or per context).

In some embodiments, the top N results rankings may be adjusted in the aggregator node 215 by applying freshness scores or freshness score tables to the respective relevance scores of the top N results. Furthermore, the aggregator node may adjust the top N rankings, per-product and/or cross-product re-ranking and co-ranking (e.g., consideration of the top N as a set).

Figure 4:
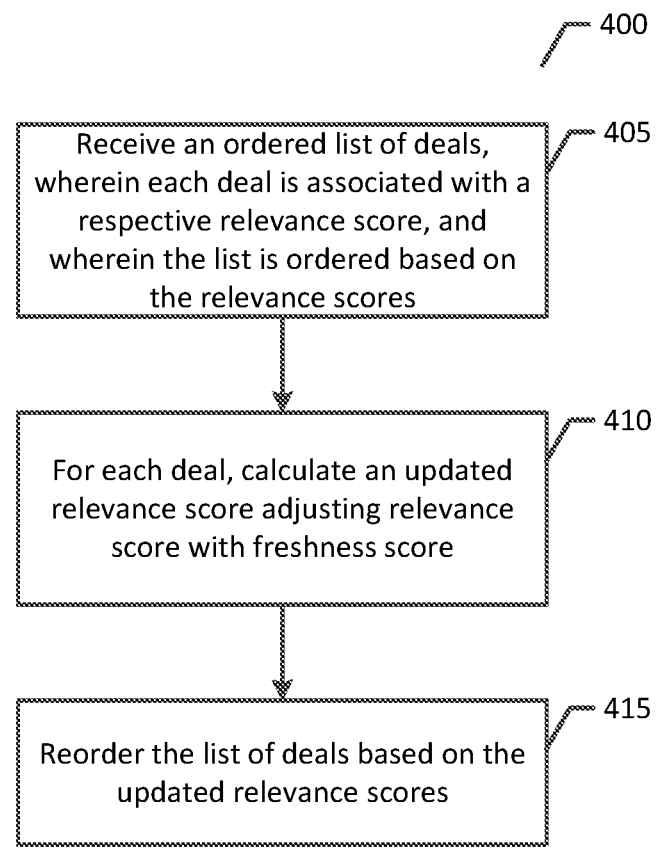
FIG. 4 is a flow diagram of an example method for dynamically updating the ranking of a set of deals using sorting-by-rating in accordance with some embodiments.

FIG. 4 is a flow diagram of an example method 400 for dynamically updating the ranking of a set of deals with freshness integration. For convenience, the method 400 will be described with respect to a system that includes one or more computing devices and performs the method 400. Specifically, the method 400 will be described with respect to processing of a set of ranked deals 122 by sorting-by-rating platform 100. In some embodiments, the platform 100 may be implemented by a computing system including one or more online networked processors (e.g., including the online sorting by rating module 120), one or more databases, and one or more offline batch processors (e.g., including the offline freshness score calculator 110).

Method 400 may begin at 405, where an online sorting by ranking module 120 may be configured to receive an ordered list of deals, such as may be provided by the distributed search cluster 220. The deals may be ordered or ranked based on relevance scores of the deals as calculated by the distributed search cluster 220. The relevance scores may be determined based on analyzing historical data to determine relevance metrics such as DDO, Odds, and Similarity, as discussed in greater detail in U.S. patent application Ser. No. 14/824,912, incorporated by reference above.

At 410, the online sorting by ranking module 120 may be configured to, for each deal, calculate an updated relevance score by adjusting the relevance score of the deal using a freshness score of the deal. In some embodiments, the online sorting by ranking module 120 may determine the freshness score of a promotion based on referencing the precomputed freshness score tables. For example, the module 120 may be configured to generate a search feature set defining one or more feature or parameter inputs (e.g., deal or user features), and may use the search feature set search the freshness score tables 112 to determine the freshness score for the deal. In some embodiments, the freshness score may represent a decrement amount or scaling factor for the relevance score that is used to generate the adjusted relevance score, thereby injecting freshness as an element of the relevance determination. The freshness score tables may be calculated by one or more offline processors based on user access probability, which will be described in detail with reference to methods 500 and 600 shown in FIGS. 5 and 6, respectively. Calculation of an updated deal relevance score will be described in detail with reference to method 700 depicted in FIG. 7.

At 415, the module 120 may be configured to re-rank the set of deals using their respective updated relevance scores. The updated relevance scores may result in a different ordering of the deals that were previously ranked without any considerations for freshness. Method 400 may then end.

Figure 5:
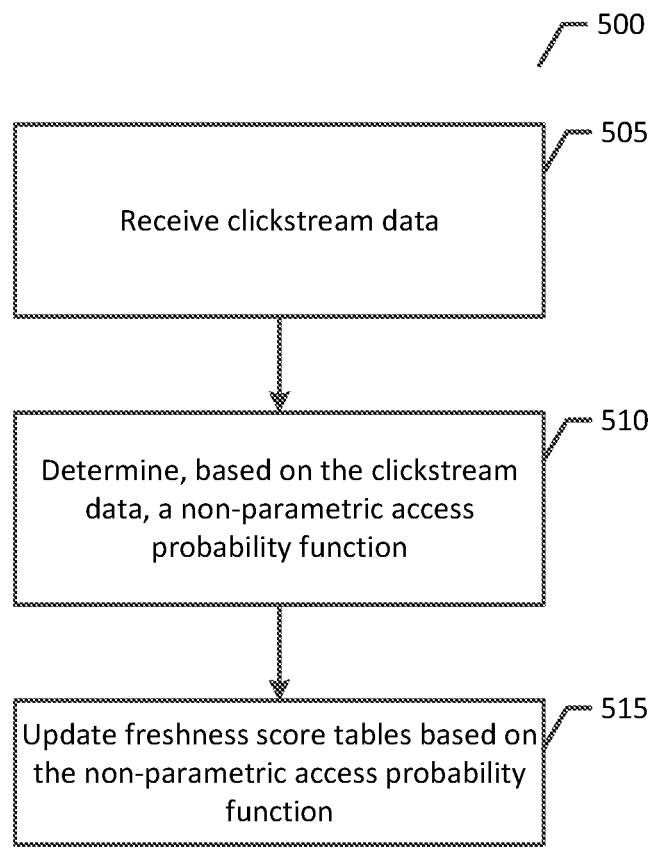
FIG. 5 is a flow diagram of an example method for calculating a freshness score for a deal using a non-parametric approach to predicting user access probability in accordance with some embodiments.

FIG. 5 is a flow diagram of an example method 500 for calculating a freshness score for a deal using a non-parametric approach to predicting user access probability. In some embodiments, method 500 may be performed to facilitate calculation of the freshness score used in step 410 of method 400.

At 505, an offline freshness score calculator 110 (e.g., one or more batch or offline processors) may be configured to receive clickstream data. The clickstream data may be generated based on tracking consumer access behavior, such as consumer interactions with electronic marketing communications sent to consumer devices. For example, the clickstream data may include send times and access times, if applicable, for deals sent the user.

The clickstream data may represent raw user data, such as daily user data (e.g., purchases, deal sends, deal accesses) that placed into a Hadoop Distributed File System (HDFS) file system.

At 510, the offline freshness score calculator 110 may be configured to determine, based on the clickstream data, a non-parametric access probability function defining the probability that the user has accessed a sent deal as a function of time. The non-parametric access probability function may be determined by tracking the user's access activities. In some embodiments, the offline freshness score calculator 110 may access the clickstream data placed into the HDFS file system for a predefined period of time, such as the past 30 days.

For example, the clickstream data may be processed to determine the precise fraction that the user opens their email and the time distribution on when they will open their email. Given these two distributions, offline freshness score calculator 110 may be configured to determine the probability in which the user will open a particular email sometime in the future given time t has elapsed since the email was sent. Deals provided via other communication channels like application or mobile alert, search, etc. may be similarly tracked and analyzed.

For example, let $o_{t \geq t_i}$ be defined as user will access a deal communication (e.g., email) at some time in the future starting at time $t_i$, $t_j$ be the time elapsed since communication was sent, $e_o$ be whether user accesses the communication ever. The offline freshness score calculator 110 may be configured to estimate the access probability, or the probability that the user will open the email some time down in the future as Equation 1:

$$P(o_{t \geq t_i}) = P(o_{t \geq t_i} \mid e_o = \text{open})P(e_o = \text{open}) +$$
$$P(o_{t \geq t_i} \mid e_o = \text{never})P(e_o = \text{never})$$
$$= P(o_{t \geq t_i} \mid e_o = \text{open})P(e_o = \text{open}) + 0$$
$$= P(e_o = \text{open}) \int_{j=t_i}^{\infty} P(o_{t=j} \mid e_o = \text{open})$$

Here, $P(e_o=\text{open})$ represents the probability of the user opening the (communication and $\int_{j=t_i}^{\infty} P(o_{t=j}|e_o=\text{open})$ represents the cumulative distribution function for time to access a communication when a communication is accessed. Whether the user will open the email at time $>=t_i$ must be capped by the probability that the user will ever open the email at all. As time goes by, the probability of open will decrease.

$P(e_o=\text{open})$ may be estimated using a simplistic non-parametric approach described above by counting the number of times the user accesses the communication versus the number of communications that have been sent (e.g., within a predefined period of time), or as discussed in greater detail below with respect to method 600, using machine learning techniques and a parametric approach.

The cumulative distribution function for time to open a communication $\int_{j=t_i}^{\infty} P(o_{t=j}|e_o=\text{open})$ may also be estimated using simple non-parametric estimation by collecting the time to open for this particular user from analyzing the clickstream data. Alternatively, as discussed in greater detail below with respect to method 600, the cumulative distribution function may also be refined as a parametric function of deal or user features using machine learning.

At 515, the offline freshness score calculator 110 may be configured to generate/update the freshness score tables 112 based on the non-parametric access probability function. A freshness score table 112 may include a listing of one or more computed freshness scores for deals previously sent to or received by the user, such as within a predefined period of time (e.g., 30 days, or some other inflection point in time when a sent deal is considered fresh again). The freshness score tables 112 may be updated on a scheduled basis (e.g., daily, weekly, etc.), where one or more features relevant at the time of update may be input to the access probability function. For the non-parametric access function, the offline freshness score calculator 110 may be configured to determine the current time, and for each sent deal, determine the time elapsed since send. The time elapsed since send may be used to calculate freshness scores for the scheduled freshness table update time using the non-parametric access function for each sent deal. As discussed in method 700 below, the online module 120 may be configured to use the updated freshness scores stored in the freshness score tables 112 when updating relevance scores. Method 500 may then end.

Figure 6:
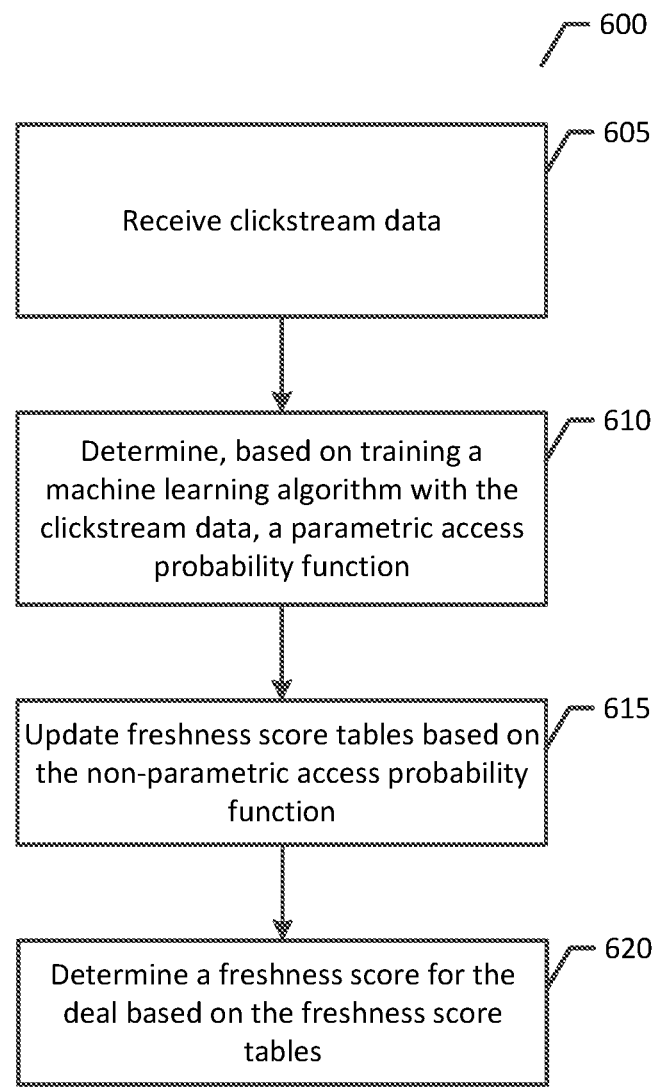
FIG. 6 is a flow diagram of an example method for calculating a freshness score for a deal using a parametric machine learning approach to predicting user access probability in accordance with some embodiments.

FIG. 6 is a flow diagram of an example method 600 for calculating a freshness score for a deal using a parametric machine learning approach to predicting user access probability. The parametric approach is capable of programmatically considering factors that affect access probability in addition to time elapsed since send such as seasonality effect, day of the week effect, time of day effect, distance from user effect, price range, slot location or prominence within a multi-deal electronic communication, category of the deal, etc, In some embodiments, method 600 may be performed to facilitate calculation of the freshness score used in step 410 of method 400, such as in alternative or addition to method 500.

At 605, an offline freshness score calculator 110 (e.g., one or more batch or offline processors) may be configured to receive clickstream data. The discussion at 505 of method 500 may be applicable at 605. In addition to tracking the clickstream data for send and access times of deals by the user, the offline freshness score calculator 110 may be further configured to track clickstream data to capture other parameters of features or attributes of the sent deals or the user.

At 610, the offline freshness score calculator 110 may be configured to determine, based on training a machine learning algorithm with the clickstream data, a parametric access probability function defining the probability that the user has accessed a sent deal as a function of time and one or more other deal or user features.

The parametric access probability may also be defined by Equation 1:

$$P(o_{t \geq t_i}) = P(e_o = \text{open}) \int_{j=t_i}^{\infty} P(o_{t=j} \mid e_o = \text{open})$$

Here, the $P(e_o=\text{open})$ and $\int_{j=t_i}^{\infty} P(o_{t=j}|e_o=\text{open})$ are each determined based on training a machine learning algorithm with training sets generated from the clickstream data.

Training data sets and a feature vector of parameters may be determined from the clickstream data to facilitate the machine learning. For example, the offline freshness score calculator 110 may be configured to define a training data set (X, Y) where $y_i \in Y$ is 1 if user accessed the sent communication (and 0 otherwise), and $x_i \in X$ are feature vector of one or deal attributes and/or one or more user attributes, such as the following feature vector including both deal and user attributes:

deal attributes
    deal category, subcategory, subcategory 2, etc.
    deal age
    time of the year, week, day
    deal performance (ddo, odds)
    subject line
    deal distance to the user
    brand recognition
user attributes
    user age
    gender
    historic prior (probability of user open for this user)

To estimate the $P(e_o=\text{open})$ for Equation 1, and given D=X, Y, a logistic regression, decision tree, and/or other machine learning technique may be used to optimize the following objective defined by Equation 2:

$$P(Y \mid X) = \prod_{i=1}^{n} P(y_i \mid x_i)$$

-continued $$= \prod_{i=1}^{n} P(x_i \mid w)^{y_i} (1 - P(x_i \mid w)_i)^{1-y_i}$$

$$= \prod_{i=1}^{n} \left( \frac{1}{1 + e^{-(\beta_0 + x_i \beta)}} \right)^{y_i} \left( \frac{e^{-(\beta_0 + x_i \beta)}}{1 + e^{-(\beta_0 + x_i \beta)}} \right)^{1-y_i}$$

It will be appreciated that in some example implementations of Equation 2, the case where $y_i=1$ represents an open condition, while the case where $y_i=0$ represents a non-open condition, and that, in some example implementations, the final step in Equation 2 assumes that the model used is a logistic regression.

In some embodiments, the objective may then be optimized using optimization technique such as gradient descent, or the like. In some embodiments, a joint distribution estimation or a likelihood ratio adjustment may be performed.

To estimate the cumulative probability that user will be opening the email $$\int_{j=t_i}^{\infty} P(o_{t=j} \mid e_o = \text{open})$$

of Equation 1, Y may be defined as the time in which user will open the communication and X may be defined as the features of the feature vector described above, a regression function may be machine learned of the form given by Equation 3:

$$Q_\tau(Y|X) = X^T \beta_\tau$$

where the objective would be to optimize the following given by Equation 4:

$$\text{argmin}_\beta = \sum_{i=1}^{n} \rho_\tau(y_i - x_i \beta)$$

It will be appreciated that in Equation 4, $\rho_\tau$ generally refers to a loss function. In example implementations that use a linear regression, such a loss function may be the squared error.

The regression provides for an estimation of the time user open the email in the τth quantile. This estimation of time in different quantile can then be used to approximate the cumulative probability that user will be opening the email $$\int_{j=t_i}^{\infty} P(o_{t=j} \mid e_o = \text{open}).$$

In some embodiments, the access probability function may be validated after being created by the machine learning model, such as by using validation sets built from clickstream data in a manner similar to the training data sets.

At 615, the offline freshness score calculator 110 may be configured to generate/update the freshness score tables 112 based on the parametric access probability function. The freshness score tables 112 may include a listing of one or more computed freshness scores for deals previously sent to or received by the consumer, such as within a predefined period of time (e.g., 36 days, or some other inflection point in time when a sent deal is considered fresh again). The freshness score tables 112 may be updated on a scheduled basis (e.g., daily, weekly, etc.), where one or more features relevant or known at the time of update may be input to the access probability function.

For the parametric access function, the offline freshness score calculator 110 may be configured to determine the time elapsed since send, as well as one or more known features or attributes of the deal or user. The time elapsed since send and the one or more known features (e.g., corresponding with the feature vector parameters) may be used to calculate freshness scores or partial freshness scores for the scheduled freshness table update time using the parametric access function for each sent deal. Method 600 may then end.

Figure 7:
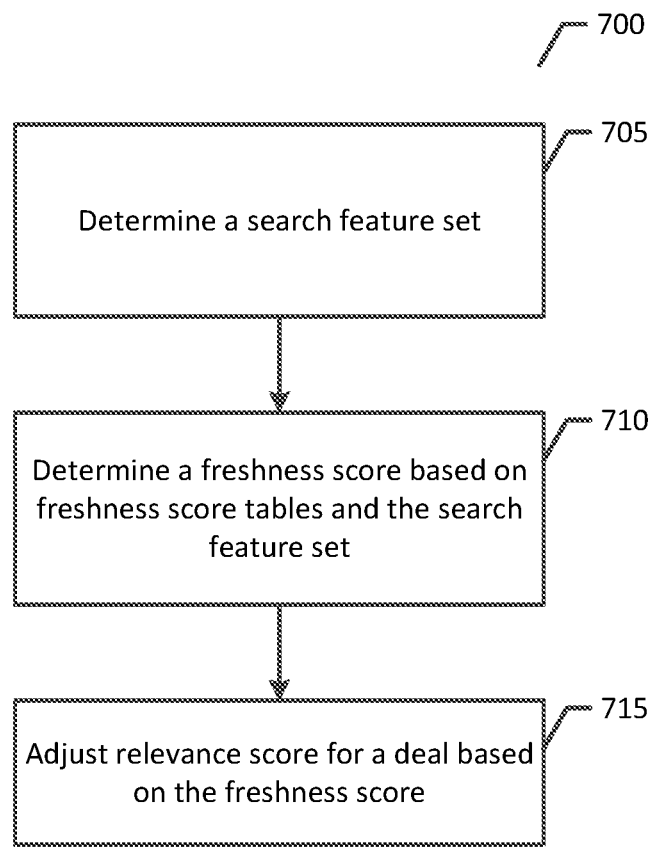
FIG. 7 is a flow diagram of an example method for calculating an updated relevance score in accordance with some embodiments.

FIG. 7 is a flow diagram of an example method 700 for calculating an updated relevance score. Method 700 may be performed by the online sorting and ranking module 120 in an efficient way that utilizes the updated relevance score tables 112 generated from the scheduled offline processes, such as at 410 of method 400.

At 705, the module 120 (e.g., one or more online or networked processors) may be configured to generate or determine a search feature set. The search feature set may correspond with the feature vector that may be input to the access probability function, such as time elapsed since send in combination with deal and/or user features for the parametric access probability function, or time elapsed since send for the non-parametric access probability function.

At 710, the module 120 may be configured to determine a freshness score based on the freshness score tables 112 and the search feature set. For example, the search feature set may be used to lookup the applicable freshness score for sent deals. In some embodiments, one or more features of the feature that were not used or known when the freshness score tables 112 were updated may be used to complete freshness score calculations in real-time, such as by applying additional features to partially calculated access probability functions for sent promotions stored in the feature score tables 112.

A commercial system may send numerous (e.g., 100+ millions) communications each day with at least 9 deals in it, the amount of clickstream data that needs to be processed can grow enormously. Even storing minimal data, the system may need to provide 1.3 terabyte of data daily with an SLA (service level agreement) of 100 ms for each user. In order to achieve the SLA, the system may pre-process the data daily and uploaded to a distributed memory only cache server (Watson KV store) including the freshness score tables 112. Each day, the system will download a set of communications sent, access events that happened within the past 24 hours and append this data to cache server. However, because there is limited space available in the cache server, the data may be truncated. This is achieved by sorting the deal with the highest penalty and storing the top k deals that have the highest penalty within the freshness score tables 112.

At 715, the module 120 may be configured to adjust the relevance score for the deal based on the freshness score. As discussed above, the relevance score to be adjusted may be determined based on relevance metrics such as DDO, Odds, and Similarity, not accounting for freshness effects of previously sent deals to the user. The freshness score, as discussed above, may represent the estimated access probability. Thus adjusting the relevance score based on the freshness score injects freshness considerations to the programmatic ranking.

Various approaches for using the freshness score may be used. In a first approach, the probability of open estimated by the freshness score may be used as a probability threshold to apply a freshness penalty to the relevance score, or not. The estimated probability may be used as a biased coin probability when a predefined freshness penalty of scaling factor is applied at the query time. For example, if the probability of open at query time is 20%, then there is a 20% chance that the freshness penalty will be applied to the relevance score of the deal.

In a second approach, the probability of open estimated by the freshness score may be used as a scaling factor for the duration (e.g., inflection point) of a sigmoid penalty function. For example, given the probability of open at query time is 20% and the inflection point is 36 days, then rather than setting the inflection point at 36 days, the inflection point may be set for 7.2 days (36*.2). This will quickly shorten the penalty that was applied to the deal prompting it to be eligible for reimpression more quickly.

In a third approach, the probability of open may be set to 0 until an actual access event for the sent deal occurs. Since majority of the users do not open the email, we can simplify our model by simply using the access as the freshness signal and penalize a deal only after a deal is accessed. While the three approaches have minor variation of the same idea, the key difference between the three approaches lies in the way reimpression will occur in each. On one end of spectrum, the third approach will allow reimpression until user actually accesses the communication. On the other end of spectrum, the second approach will allow reimpression only after the chance that the user opens email drops to close to zero. In between is the first approach, where there are chances of reimpression immediately after email is sent but at a much lesser degree but gradually increases as time passes the user's typically time of opening a communication.

In a fourth approach, each sent deal that has not accessed may be fully penalized or adjusted by a scaling factor. If there are unaccessed communications for the deal, the access probability may be calculated. When the access probability drops below a threshold, the relevance score of the deal may be penalized or adjusted so the same deal is not sent. An alternate, smoother approach is to not do a 0-1 penalty, but use a penalty=base penalty x likelihood_of_open(d), where d is days since send. Here, it may be difficult to learn the function likelihood_of_open(d) for each individual user. But users can be grouped by their historical fraction of opens. The observed open lag time distribution for each group can then be used to compute the likelihood_of_open(g,d), where g is the group and d is the days elapsed. For groups that rarely open, the behavior may be modeled as being that of moderately active groups, to avoid proposing the same deal over and over again.

Some embodiments may provide for adjustments in the event that the offline calculations fail or are unavailable. For example, invalid or unusable freshness scores may result in the open probability remaining the same when it should decrease as time progress. This means approach 1 and 3 will have higher reimpression rate than it should. This means approach 2 will have lower reimpression rate than it should. As such, relevance scores may be further adjusted depending on the approach when valid offline calculations are unavailable. In some embodiments, rather than relying on personalized freshness scores of individual users, the model can be less personalized (e.g., built over users with previously tracked similar levels of activity).

In some embodiments, in addition to adjusting relevance scores based on freshness score, the relevance scores may be further adjusted based on co-ranking of a ranked list of deals as a collective set.

Some embodiments may provide for techniques that compound freshness penalties. If the same deal is sent multiple times, that deal should not be proposed until each of the communications including the deal has low chance of being opened. Using the minimum value over the penalties across sent deals seems acceptable and should lend itself to easy computation; or, a more accurate model may be to compute the probability of the event that none of the communications are accessed.

Some embodiments may provide for techniques that handle deal slot position or prominence within electronic marketing communications as a parameter or feature. In general, even if a user accesses a communication, the user may be less likely to notice deals in lower positions. As such, the freshness penalty, scaling factor, etc. may be adjusted based on position. A rough adjustment could be based on the relative click or purchase volume of similar deals, based on position. So if click volume in a slot position P2 is half that of P1 (ideally over similarly relevant deals to avoid the relevance bias), one can incorporate this into the model by assuming that upon accessing a communication, P1 is accessed, but P2 is only accessed with 0.5 probability. Method 700 may then end.

Figure 8:
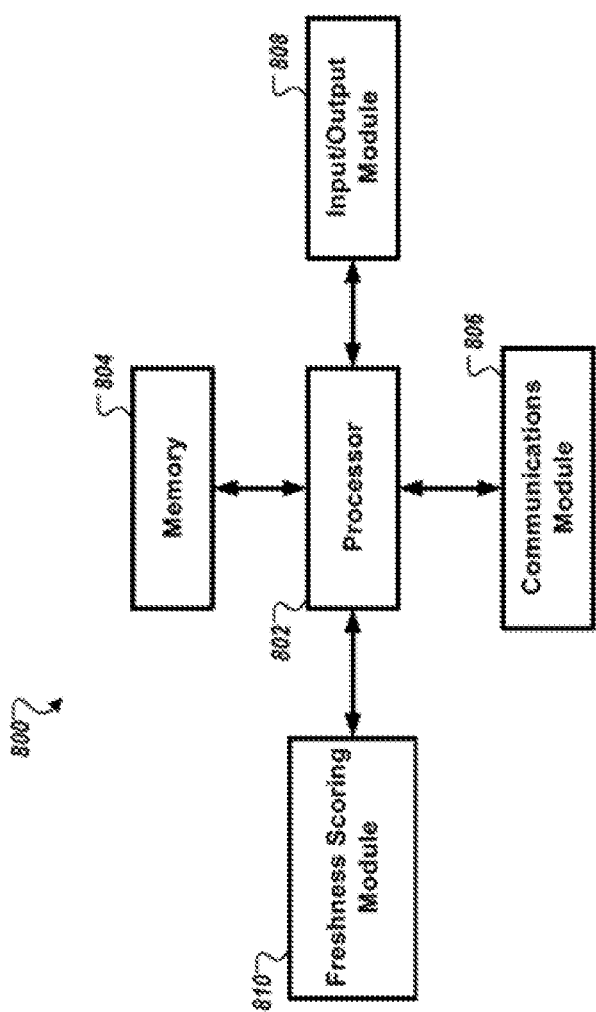
FIG. 8 illustrates a schematic block diagram of circuitry that can be included in a computing device, such as a sorting-by-rating platform, in accordance with some embodiments discussed herein.

FIG. 8 shows a schematic block diagram of circuitry 800, some or all of which may be included in, for example, sorting-by-rating system 100. As illustrated in FIG. 8, in accordance with some example embodiments, circuitry 800 can include various means, such as processor 802, memory 804, communications module 806, and/or input/output module 808. As referred to herein, "module" includes hardware, software and/or firmware configured to perform one or more particular functions. In this regard, the means of circuitry 800 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 804) that is executable by a suitably configured processing device (e.g., processor 802), or some combination thereof.

Processor 802 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 10 as a single processor, in some embodiments, processor 802 comprises a plurality of processors. The plurality of processors may be embodied on a single computing device or may be distributed across a plurality of computing devices collectively configured to function as circuitry 800. The plurality of processors may be in operative communication with each other and may be collectively configured to perform one or more functionalities of circuitry 800 as described herein. In an example embodiment, processor 802 is configured to execute instructions stored in memory 804 or otherwise accessible to processor 802. These instructions, when executed by processor 802, may cause circuitry 800 to perform one or more of the functionalities of circuitry 800 as described herein.

Whether configured by hardware, firmware/software methods, or by a combination thereof, processor 802 may comprise an entity capable of performing operations according to embodiments of the present invention while configured accordingly. Thus, for example, when processor 802 is embodied as an ASIC, FPGA or the like, processor 802 may comprise specifically configured hardware for conducting one or more operations described herein. Alternatively, as another example, when processor 802 is embodied as an executor of instructions, such as may be stored in memory 804, the instructions may specifically configure processor 802 to perform one or more algorithms and operations described herein, such as those discussed in connection with FIGS. 1-3.

Memory 804 may comprise, for example, volatile memory, non-volatile memory, or some combination thereof. Although illustrated in FIG. 8 as a single memory, memory 804 may comprise a plurality of memory components. The plurality of memory components may be embodied on a single computing device or distributed across a plurality of computing devices. In various embodiments, memory 804 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 804 may be configured to store information, data (including analytics data), applications, instructions, or the like for enabling circuitry 800 to carry out various functions in accordance with example embodiments of the present invention. For example, in at least some embodiments, memory 804 is configured to buffer input data for processing by processor 802. Additionally or alternatively, in at least some embodiments, memory 804 is configured to store program instructions for execution by processor 802. Memory 804 may store information in the form of static and/or dynamic information. This stored information may be stored and/or used by circuitry 800 during the course of performing its functionalities.

Communications module 806 may be embodied as any device or means embodied in circuitry, hardware, a computer program product comprising computer readable program instructions stored on a computer readable medium (e.g., memory 804) and executed by a processing device (e.g., processor 802), or a combination thereof that is configured to receive and/or transmit data from/to another device, such as, for example, a second circuitry 800 and/or the like. In some embodiments, communications module 806 (like other components discussed herein) can be at least partially embodied as or otherwise controlled by processor 802. In this regard, communications module 806 may be in communication with processor 802, such as via a bus. Communications module 806 may include, for example, an antenna, a transmitter, a receiver, a transceiver, network interface card and/or supporting hardware and/or firmware/software for enabling communications with another computing device. Communications module 806 may be configured to receive and/or transmit any data that may be stored by memory 804 using any protocol that may be used for communications between computing devices. Communications module 806 may additionally or alternatively be in communication with the memory 804, input/output module 808 and/or any other component of circuitry 800, such as via a bus.

Input/output module 808 may be in communication with processor 802 to receive an indication of a user input and/or to provide an audible, visual, mechanical, or other output to a user. Some example visual outputs that may be provided to a user by circuitry 800 are discussed in connection with FIGS. 1-3. As such, input/output module 808 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 800 is embodied as a server or database, aspects of input/output module 808 may be reduced as compared to embodiments where circuitry 1000 is implemented as an end-user machine or other type of device designed for complex user interactions. In some embodiments (like other components discussed herein), input/output module 808 may even be eliminated from circuitry 800. Alternatively, such as in embodiments wherein circuitry 800 is embodied as a server or database, at least some aspects of input/output module 808 may be embodied on an apparatus used by a user that is in communication with circuitry 800. Input/output module 808 may be in communication with the memory 804, communications module 806, and/or any other component(s), such as via a bus. Although more than one input/output module and/or other component can be included in circuitry 800, only one is shown in FIG. 8 to avoid overcomplicating the drawing (like the other components discussed herein).

The freshness scoring module 810 may also or instead be included and configured to perform the functionality discussed herein related adjusting relevance scores based on freshness as discussed above. In some embodiments, some or all of the functionality of the freshness scoring module 810 may be performed by processor 802. In this regard, the example processes and algorithms discussed herein can be performed by at least one processor 802 and/or freshness scoring module 810. For example, non-transitory computer readable media can be configured to store firmware, one or more application programs, and/or other software, which include instructions and other computer-readable program code portions that can be executed to control each processor (e.g., processor 802 and/or freshness scoring module 810) of the components of system 100 to implement various operations, including the examples shown above. As such, a series of computer-readable program code portions are embodied in one or more computer program products and can be used, with a computing device, server, and/or other programmable apparatus, to produce machine-implemented processes.

Any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of system 100. In some embodiments, one or more external systems (such as a remote cloud computing and/or data storage system) may also be leveraged to provide at least some of the functionality discussed herein.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 802 and/or freshness scoring module 810 discussed above with reference to FIG. 8, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 804) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A relevance service system, comprising:
one or more batch processors configured to:
transmit respective electronic communications to a plurality of user devices at respective transmission times;
track clickstream data generated by a plurality of user device interactions associated with the respective electronic communications to determine respective electronic communication access event times associated with respective instances for accessing content of the respective electronic communications;
determine time to open data based on the respective transmission times and the respective electronic communication access event times, wherein the time to open data is indicative of respective time to open terms that begin at the respective transmission times and end at the respective electronic communication access event times;
train, based at least in part on the time to open data, a machine learning model to determine a predicted time distribution of predicted time to open data indicative of respective predicted times associated with an electronic communication being accessed via a user device, wherein the respective predicted times correspond to a predicted interval of time that begins at transmission of the electronic communication to the user device and ends at access of the electronic communication via the user device;
determine, based on the predicted time distribution, respective access scores for the electronic communication being accessed via the user device at the respective times;
determine, based on the respective access scores associated with the predicted time distribution and data associated with one or more times the communication content has been provided to the user device, a freshness score that defines user access probability for a subsequent electronic communication comprising the communication content; and
store the freshness score in a database; and
one or more online processors configured to:
generate a relevance score for the communication content in response to a search request being received;
apply the freshness score associated with the predicted time distribution to the relevance score to generate an updated relevance score;
rank a plurality of communication content sets comprising at least the communication content based on respective updated relevance scores to generate ranked communication content; and
return a subset of the ranked communication content.

2. The system of claim 1, wherein the one or more batch processors configured to train the machine learning model comprises the one or more batch processors being configured to determine a parametric access probability function that comprises a cumulative distribution function associated with the predicted time distribution.

3. The system of claim 1, wherein the one or more batch processors configured to train the machine learning model comprises the one or more batch processors being configured to:
generate a feature vector based on the clickstream data; and
determine, based on training the machine learning model with the training data set and the feature vector, the predicted time distribution as a function of the feature vector.

4. The system of claim 3, wherein the one or more batch processors configured to determine the freshness score comprises the one or more servers being configured to, on a scheduled basis:
  determine a feature set related to the feature vector; and
  determine the freshness score based on applying the feature set to a cumulative distribution function associated with the predicted time distribution.

5. The system of claim 2, wherein the parametric access probability function comprises a probability of the user opening the electronic communication as a function of time, and wherein at least one of the probability of the user opening the electronic communication or the predicted time distribution is generated based on the machine learning model associated with the training data set.

6. The system of claim 3, wherein the one or more online processors configured to apply the freshness score to the relevance score to generate the updated relevance score comprises the one or more online processors being configured to:
  determine a search feature set related to the feature vector; and
  select the freshness score from the database based on the search feature set.

7. The system of claim 3, wherein the one or more online processors configured to apply the freshness score to the relevance score to generate the updated relevance score comprises the one or more online processors being configured to probabilistically apply a predefined penalty value to the relevance score based on the freshness score.

8. The system of claim 3, wherein the one or more online processors configured to apply the freshness score to the relevance score to generate the updated relevance score comprises the one or more online processors being configured to apply the freshness score as a scaling factor to the relevance score.

9. The system of claim 3, wherein the one or more online processors configured to apply the freshness score to the relevance score to generate the updated relevance score comprises the one or more online processors being configured to apply the freshness score subsequent to determining an actual access to a deal associated with the electronic communications based on the clickstream data.

10. The system of claim 1, wherein:
  the clickstream data is first clickstream data and the user interactions are first user interactions;
  the one or more online processors are further configured to:
    provide a particular electronic communication to the user device including the subset of the ranked communication content; and
    generate second clickstream data based on tracking second user interactions with the particular electronic communication; and
  the one or more batch processors are further configured to, on a scheduled basis, update the predicted time distribution based on the second clickstream data.

11. The system of claim 1, wherein the one or more batch processors configured to train the machine learning model comprises the one or more batch processors being configured to determine an access probability function associated with the predicted time distribution.

12. A computer-implemented method, comprising:
  transmitting respective electronic communications to a plurality of user devices at respective transmission times;
  tracking clickstream data generated by a plurality of user device interactions associated with the respective electronic communications to determine respective electronic communication access event times associated with respective instances for accessing content of the respective electronic communications;
  determining time to open data based on the respective transmission times and the respective electronic communication access event times, wherein the time to open data is indicative of respective time to open terms that begin at the respective transmission times and end at the respective electronic communication access event times;
  training, based at least in part on the time to open data, a machine learning model to determine a predicted time distribution of predicted time to open data indicative of respective predicted times associated with an electronic communication being accessed via a user device, wherein the respective predicted times correspond to a predicted interval of time that begins at transmission of the electronic communication to the user device and ends at access of the electronic communication via the user device;
  determining, based on the predicted time distribution, respective access scores for the electronic communication being accessed via the user device at the respective times;
  determining, based on the respective access scores associated with the predicted time distribution and data associated with one or more times the communication content has been provided to the user device, a freshness score that defines user access probability for a subsequent electronic communication comprising the communication content;
  storing the freshness score in a database;
  generating a relevance score for the communication content in response to receiving a search request;
  applying the freshness score associated with the predicted time distribution to the relevance score to generate an updated relevance score;
  ranking a plurality of communication content sets comprising at least the communication content based on respective updated relevance scores to generate ranked communication content; and
  returning a subset of the ranked communication content.

13. The computer-implemented method of claim 12, wherein the training the machine learning model comprises determining a parametric access probability function that comprises a cumulative distribution function associated with the predicted time distribution.

14. The computer-implemented method of claim 12, wherein the training the machine learning model comprises:
  generating a feature vector based on the clickstream data; and
  determining, based on training the machine learning model with the training data set and the feature vector, the predicted time distribution as a function of the feature vector.

15. The computer-implemented method of claim 14, wherein the determining the freshness core comprises, on a scheduled basis:
  determining a feature set related to the feature vector; and
  determining the freshness score based on applying the feature set to a cumulative distribution function associated with the predicted time distribution.

16. The computer-implemented method of claim 13, wherein the parametric access probability function comprises a probability of the user opening the electronic communication as a function of time, and wherein the computer-implemented method comprises generating at least one of the probability of the user opening the electronic communication or the predicted time distribution based on the machine learning model associated with the training data set.

17. The computer-implemented method of claim 14, wherein the applying the freshness score to the relevance score to generate the updated relevance score comprises:
   determining a search feature set related to the feature vector; and
   selecting the freshness score from the database based on the search feature set.

18. The computer-implemented method of claim 14, wherein the applying the freshness score to the relevance score to generate the updated relevance score comprises probabilistically applying a predefined penalty value to the relevance score based on the freshness score.

19. The computer-implemented method of claim 14, wherein the applying the freshness score to the relevance score to generate the updated relevance score comprises applying the freshness score as a scaling factor to the relevance score.

20. The computer-implemented method of claim 14, wherein the applying the freshness score to the relevance score to generate the updated relevance score comprises applying the freshness score subsequent to determining an actual user access to a deal associated with the electronic communications based on the clickstream data.

21. The computer-implemented method of claim 14, wherein the clickstream data is first clickstream data and the user interactions are first user interactions, and the computer-implemented method further comprising:
   providing a particular electronic communication to the user device including the subset of the ranked communication content; and
   generating second clickstream data based on tracking second user interactions with the particular electronic communication; and
   on a scheduled basis, updating the predicted time distribution based on the second clickstream data.

22. The computer-implemented method of claim 12, wherein the training the machine learning model comprises determining a non-parametric access probability function associated with the predicted time distribution.

23. A computer program product comprising at least one non-transitory computer-readable storage medium having computer-executable program code instruction stored therein, the computer-executable program code instructions comprising program code instructions configured to:
   transmit respective electronic communications to a plurality of user devices at respective transmission times;
   track clickstream data generated by a plurality of user device interactions associated with the respective electronic communications to determine respective electronic communication access event times associated with respective instances for accessing content of the respective electronic communications;
   determine time to open data based on the respective transmission times and the respective electronic communication access event times, wherein the time to open data is indicative of respective time to open terms that begin at the respective transmission times and end at the respective electronic communication access event times;
   train, based at least in part on the time to open data, a machine learning model to determine a predicted time distribution of predicted time to open data indicative of respective predicted times associated with an electronic communication being accessed via a user device, wherein the respective predicted times correspond to a predicted interval of time that begins at transmission of the electronic communication to the user device and ends at access of the electronic communication via the user device;
   determine, based on the predicted time distribution, respective access scores for the electronic communication being accessed via the user device at the respective times, wherein the computer-executable program code instructions comprise program code instructions configured to determine the predicted time distribution by at least:
      generating a feature vector based on the clickstream data; and
      determining, based on training the machine learning model with the training data set and the feature vector, the predicted time distribution as a function of the feature vector;
   determine, based on the respective access scores associated with the predicted time distribution and data associated with one or more times the communication content has been provided to the user device, a freshness score defining user access probability for a subsequent electronic communication comprising the communication content;
   store the freshness score in a database;
   generate a relevance score for the communication content in response to a search request being received;
   apply the freshness score associated with the predicted time distribution to the relevance score to generate an updated relevance score;
   rank a plurality of communication content sets comprising at least the communication content based on respective updated relevance scores to generate ranked communication content; and
   return a subset of the ranked communication content.

* * * * *

UNITED STATES PATENT AND TRADEMARK OFFICE
CERTIFICATE OF CORRECTION

| | | |
|---|---|---|
| PATENT NO. | : 11,442,945 B1 | Page 1 of 1 |
| APPLICATION NO. | : 15/393721 | |
| DATED | : September 13, 2022 | |
| INVENTOR(S) | : Tsai et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this
Eleventh Day of February, 2025

Coke Morgan Stewart
*Acting Director of the United States Patent and Trademark Office*